(12) United States Patent
Talley et al.

(10) Patent No.: US 10,339,010 B1
(45) Date of Patent: Jul. 2, 2019

(54) SYSTEMS AND METHODS FOR SYNCHRONIZATION OF BACKUP COPIES

(71) Applicants: Bruce Talley, Campbell, CA (US); Nail Ahmad Amin Abdallah, Kharkov (UA); Oleksii Serhiovych Osypov, Kyiv (UA); Veniamin Serhiovych Simonov, Kyiv (UA); Sergii Iazvinskyi, Kyiv (UA)

(72) Inventors: Bruce Talley, Campbell, CA (US); Nail Ahmad Amin Abdallah, Kharkov (UA); Oleksii Serhiovych Osypov, Kyiv (UA); Veniamin Serhiovych Simonov, Kyiv (UA); Sergii Iazvinskyi, Kyiv (UA)

(*) Notice: Subject to any disclaimer, the term of this patent is extended or adjusted under 35 U.S.C. 154(b) by 432 days.

(21) Appl. No.: 14/679,214

(22) Filed: Apr. 6, 2015

Related U.S. Application Data

(60) Provisional application No. 61/975,766, filed on Apr. 5, 2014.

(51) Int. Cl.
*G06F 17/30* (2006.01)
*G06F 11/14* (2006.01)

(52) U.S. Cl.
CPC .... *G06F 11/1458* (2013.01); *G06F 17/30581* (2013.01); *G06F 2201/80* (2013.01)

(58) Field of Classification Search
CPC .......... G06F 11/1458; G06F 17/30581; G06F 2201/80
See application file for complete search history.

(56) References Cited

U.S. PATENT DOCUMENTS

| | | | | |
|---|---|---|---|---|
| 6,643,671 B2* | 11/2003 | Milillo | ............... | G06F 11/2082 707/622 |
| 6,665,815 B1* | 12/2003 | Goldstein | ........... | G06F 11/1451 714/20 |
| 6,745,303 B2* | 6/2004 | Watanabe | ........... | G06F 11/2058 707/999.01 |
| 6,880,051 B2* | 4/2005 | Timpanaro-Perrotta | ..................... | G06F 11/1448 707/999.202 |
| 6,981,114 B1* | 12/2005 | Wu | ..................... | G06F 11/1469 711/112 |
| 7,065,589 B2* | 6/2006 | Yamagami | .............. | G06F 3/067 707/999.202 |
| 7,783,604 B1 | 8/2010 | Yueh | | |
| 8,412,810 B1 | 4/2013 | Tompkins | | |
| 8,453,145 B1 | 5/2013 | Naik | | |
| 8,473,782 B2* | 6/2013 | Park | .................... | G06F 11/1443 714/15 |

(Continued)

*Primary Examiner* — Jared M Bibbee
(74) *Attorney, Agent, or Firm* — Tillman Wright, PLLC; Jeremy C. Doerre; James D. Wright

(57) ABSTRACT

A method involves synchronization of one or more secondary backup copies with a primary backup copy. The synchronization does not require additional reading of the original data, as the primary backup copy serves as a source of data. The synchronization process identifies difference between the primary backup copy and the secondary backup copy, so that only differential data is transferred and stored during the synchronization, eliminating the need to repeatedly transfer an entire copy to a secondary location. The method can leverage data compression and de-duplication for more efficient resource utilization.

20 Claims, 11 Drawing Sheets

(56) References Cited

U.S. PATENT DOCUMENTS

| | | | |
|---|---|---|---|
| 8,533,189 B2* | 9/2013 | Ingen | G06F 11/1451 707/640 |
| 8,671,081 B2* | 3/2014 | Kaisermayr | G06F 11/0793 707/690 |
| 9,354,907 B1 | 5/2016 | Teli | |
| 9,946,889 B2 | 4/2018 | Talley et al. | |
| 2002/0049776 A1* | 4/2002 | Aronoff | G06F 17/30174 |
| 2002/0059505 A1* | 5/2002 | St Pierre | G06F 11/1451 711/162 |
| 2002/0103943 A1* | 8/2002 | Lo | H04L 29/06 710/2 |
| 2003/0061456 A1* | 3/2003 | Ofek | G06F 11/1458 711/162 |
| 2004/0078569 A1 | 4/2004 | Hotti | |
| 2004/0111390 A1* | 6/2004 | Saito | G06F 11/1435 |
| 2004/0199768 A1 | 10/2004 | Nail | |
| 2009/0113109 A1* | 4/2009 | Nelson | G06F 11/203 711/6 |
| 2009/0210427 A1 | 8/2009 | Ieidler | |
| 2003/0288084 | 11/2009 | Astete et al. | |
| 2010/0070725 A1 | 3/2010 | Prahlad | |
| 2011/0087874 A1 | 4/2011 | Timashev | |
| 2011/0167298 A1* | 7/2011 | Lee | G06F 11/1658 714/18 |
| 2012/0137098 A1 | 5/2012 | Wang | |
| 2012/0297311 A1* | 11/2012 | Duggal | G06F 9/468 715/740 |
| 2013/0185457 A1* | 7/2013 | Campbell | G06F 3/067 710/5 |
| 2013/0312068 A1 | 11/2013 | Mortimore | |
| 2013/0332505 A1* | 12/2013 | Karandikar | H04L 67/1002 709/202 |
| 2014/0282511 A1 | 9/2014 | Zheng | |
| 2015/0186668 A1* | 7/2015 | Whaley | G06F 21/6218 713/156 |
| 2015/0205974 A1 | 7/2015 | Talley et al. | |
| 2017/0134487 A1* | 5/2017 | Karandikar | H04L 67/1095 |

\* cited by examiner

SYSTEMS AND METHODS FOR SYNCHRONIZATION OF BACKUP COPIES

CROSS-REFERENCE TO RELATED APPLICATION

The present application is a U.S. nonprovisional patent application of, and claims priority under 35 U.S.C. § 119(e) to, U.S. provisional patent application Ser. No. 61/975,766, filed Apr. 5, 2014, which provisional patent application is incorporated by reference herein. A copy of this application is attached hereto as Appendix A, which appendix is hereby incorporated herein by reference.

Further, the present application hereby incorporates herein by reference U.S. Pat. No. 6,880,051, U.S. Pat. No. 8,533,189, U.S. Patent Application Publication No. 2004/0111390, U.S. Patent Application Publication No. 2003/0061456, U.S. Patent Application Publication No. 2002/0059505, and U.S. Pat. No. 6,665,815.

COPYRIGHT STATEMENT

All of the material in this patent document is subject to copyright protection under the copyright laws of the United States and other countries. The copyright owner has no objection to the facsimile reproduction by anyone of the patent document or the patent disclosure, as it appears in official governmental records but, otherwise, all other copyright rights whatsoever are reserved.

BACKGROUND OF THE INVENTION

The present invention generally relates to data backup.

Backing up data to prevent data loss in the event of disaster is a normal industry practice. Many software and hardware solutions exist on the market that implement data backup and maintain backup copies. Such solutions are utilized so that, if original data is lost, it can be restored from a relevant backup copy.

There are many techniques and approaches to backing up data. In most cases, a backup copy is created as a result of a backup process. The copy must be stored, and, most often, synchronized with the original data. In the simplest scenario, a backup copy is stored in the same place where the original data is stored (locally). Local backup has certain disadvantages. One significant drawback is that in the event of a major disaster, local backup will likely be lost along with the original data. For the purpose of keeping data more protected against unexpected conditions, many enterprises prefer to store backup copies at a remote location, such as a disaster recovery site or in a cloud.

In certain scenarios, it is reasonable to have both a local backup copy and a remote backup copy, with local backup being utilized for quick operational restore, and remote backup being utilized for restore in case of a major disaster. Additionally or alternatively, remote backup can be used for long-term archiving to store backup data for a number of years back in time.

Although it is sometimes desired to have multiple backup copies, it is not always efficient or effective to create two backup copies if creation of each of the copies involves reading the original data. One reason is that reading the original data multiple times produces additional resource consumption in the infrastructure where the data is stored. Another reason is that if the original data is continuously changing, two backup copies of the same data that are made in different points in time may appear to be different.

A need exists for improvement in data backup. This need and other needs are addressed by one or more aspects of the present invention.

SUMMARY OF THE INVENTION

The present invention includes many aspects and features. Moreover, while many aspects and features relate to, and are described in, a particular context, the present invention is not limited to use only in this context, as will become apparent from the following summaries and detailed descriptions of aspects, features, and one or more embodiments of the present invention.

Accordingly, one aspect of the present invention relates to computer implemented methods and systems to provide synchronization of multiple backup copies, and synchronizing of one or more secondary backup copies, local or remote, with a primary backup copy. Such systems and methods preferably provide efficient utilization of available network, storage and compute resources.

Another aspect relates to technologies including computer implemented methods and systems for synchronization of one or more secondary backup copies with a primary backup copy. The synchronization does not require additional reading of the original data, as the primary backup copy serves as a source of data. The synchronization process preferably identifies differences between the primary backup copy and the secondary backup copy, so that only differential data is being transferred and stored during the synchronization, eliminating the need to perform full backup copy at the secondary location. The aforesaid synchronization system can also leverage data compression and deduplication for more efficient resource utilization.

Another aspect relates to a system that provides an ability to synchronize a single primary backup copy to one or more secondary backup copies which can potentially be stored at one or more remote locations. In one or more preferred implementations, a system is implemented in a way that it will synchronize only changes between backup copies, and perform the synchronization effectively in terms of compute, storage and network resource utilization.

Another aspect relates to a method for providing and synchronizing multiple backup copies, the method comprising receiving, at a data processing engine running on a first electronic device from a second electronic device associated with original storage, first data corresponding to a first version of original data stored in the original data storage; effecting creating, in primary backup storage at a location remote to the first electronic device based on the received first data, a primary backup copy of the first version of the original data; receiving, at the data processing engine running on the first electronic device from the primary backup storage, second data corresponding to the primary backup copy stored at the primary backup storage; creating, in secondary backup storage at a second location remote to the first electronic device based on the received second data, a secondary backup copy of the first version of the original data; periodically determining, by the data processing engine, whether the original data stored in the original data storage has been changed; based on determining that the original data stored in the original data storage has been changed to a second version, automatically synchronizing, by the data processing engine based on data received from the original data storage, the primary backup copy stored in the primary backup storage to correspond to the second version; periodically determining, by the data processing engine, whether the primary backup copy stored in the primary backup storage differs from the secondary backup copy stored in the secondary backup storage; and based on determining that the primary backup copy stored in the primary data storage differs from the secondary backup copy stored in the secondary data storage, automatically synchronizing, by the data processing engine based on differential data received from the primary backup storage, the secondary backup copy to correspond to the second version.

In a feature of this aspect, the first electronic device comprises a physical computer.

In a feature of this aspect, the first electronic device comprises a virtual computer.

In a feature of this aspect, the first electronic device comprises a processor.

In a feature of this aspect, the first electronic device comprises a server.

In a feature of this aspect, the original data storage is located at a server computer.

In a feature of this aspect, the original data storage is located at a private cloud.

In a feature of this aspect, the original data storage is located at a public cloud.

In a feature of this aspect, the original data storage is located at a desktop computer.

In a feature of this aspect, the original data storage is located at a laptop computer.

In a feature of this aspect, the original data storage is located at a mobile device.

In a feature of this aspect, the original data storage is located at a phone.

In a feature of this aspect, the original data storage is located at a tablet.

In a feature of this aspect, the method comprises use of data compression while synchronizing data.

In a feature of this aspect, the method comprises use of data de-duplication while synchronizing data.

In a feature of this aspect, the method comprises use of data encryption while synchronizing data.

Another aspect relates to a method for providing and synchronizing multiple backup copies, the method comprising receiving, at a first data processing engine running on a first electronic device from a second electronic device associated with original data storage, first data corresponding to a first version of original data stored in the original data storage; effecting creating, in primary backup storage at a location remote to the first electronic device based on the received first data, a primary backup copy of the first version of the original data; receiving, at the first data processing engine running on the first electronic device from the primary backup storage, second data corresponding to the primary backup copy stored at the primary backup storage, and communicating the second data to a second data processing engine; effecting creating, by the second data processing engine in secondary backup storage based on the received second data, a secondary backup copy of the first version of the original data; periodically determining, by the first data processing engine, whether the original data stored in the original data storage has been changed; based on determining that the original data stored in the original data storage has been changed to a second version, automatically synchronizing, by the first data processing engine based on data received from the original data storage, the primary backup copy stored in the primary backup storage to correspond to the second version; periodically determining, by one or more of the first data processing engine and the second data processing engine, whether the primary backup copy stored in the primary backup storage differs from the secondary backup copy stored in the secondary backup storage; and based on determining that the primary backup copy stored in the primary data storage differs from the secondary backup copy stored in the secondary data storage, automatically synchronizing, by the first and second data processing engines based on differential data received from the primary backup storage, the secondary backup copy to correspond to the second version.

Another aspect relates to a system for synchronization of backup copies, the system comprising primary backup storage; secondary backup storage; one or more computers running data processing engine(s); and one or more data processing engines.

In a feature of this aspect, a single data processing engine is utilized.

In a feature of this aspect, multiple data processing engines are utilized.

Another aspect relates to a method for creation of a secondary backup copy, the method comprising creating a secondary backup copy entity; reading primary backup copy data; replicating backup copy data to the secondary backup storage; and creating a recovery point on the secondary backup copy.

In a feature of this aspect, a single backup copy can have only one recovery point.

In a feature of this aspect, a single backup copy can have multiple recovery points.

In a feature of this aspect, a single data processing engine is utilized for synchronization of backup copies.

In a feature of this aspect, multiple data processing engines are utilized for synchronization of backup copies.

In feature of this aspect, the method includes use of data compression while replicating backup copy data.

In feature of this aspect, the method includes use of data de-duplication while replicating backup copy data.

In feature of this aspect, the method includes use of data encryption while replicating backup copy data.

Another aspect relates to a method for synchronization of secondary backup copy with a primary backup copy, the method comprising checking if primary and secondary backup copies are different; determining changes since a last successful synchronization; replicating changed data to the secondary backup copy; and creating a recovery point on the secondary backup copy.

In a feature of this aspect, a backup copy can have only one recovery point.

In a feature of this aspect, a backup copy can have multiple recovery points.

In a feature of this aspect, information about changes since a last successful synchronization is determined by a data processing engine.

In a feature of this aspect, information about changes since a last successful synchronization is already contained in a backup copy.

In a feature of this aspect, synchronization is triggered by a user command.

In a feature of this aspect, the synchronization is triggered on schedule.

In a feature of this aspect, the synchronization is automatically triggered by a change in the primary backup copy.

In a feature of this aspect, the synchronization occurs continuously.

In a feature of this aspect, a single data processing engine is utilized for synchronization of backup copies.

In a feature of this aspect, multiple data processing engines are utilized for synchronization of backup copies.

In a feature of this aspect, the method includes use of data compression while replicating backup copy data.

In a feature of this aspect, the method includes use of data de-duplication while replicating backup copy data.

In a feature of this aspect, the method includes use of data encryption while replicating backup copy data.

In addition to the aforementioned aspects and features of the present invention, it should be noted that the present invention further encompasses the various possible combinations and subcombinations of such aspects and features. Thus, for example, any aspect may be combined with an aforementioned feature in accordance with the present invention without requiring any other aspect or feature.

BRIEF DESCRIPTION OF THE DRAWINGS

One or more preferred embodiments of the present invention now will be described in detail with reference to the accompanying drawings, wherein the same elements are referred to with the same reference numerals, and wherein.

DETAILED DESCRIPTION

Figure 1:
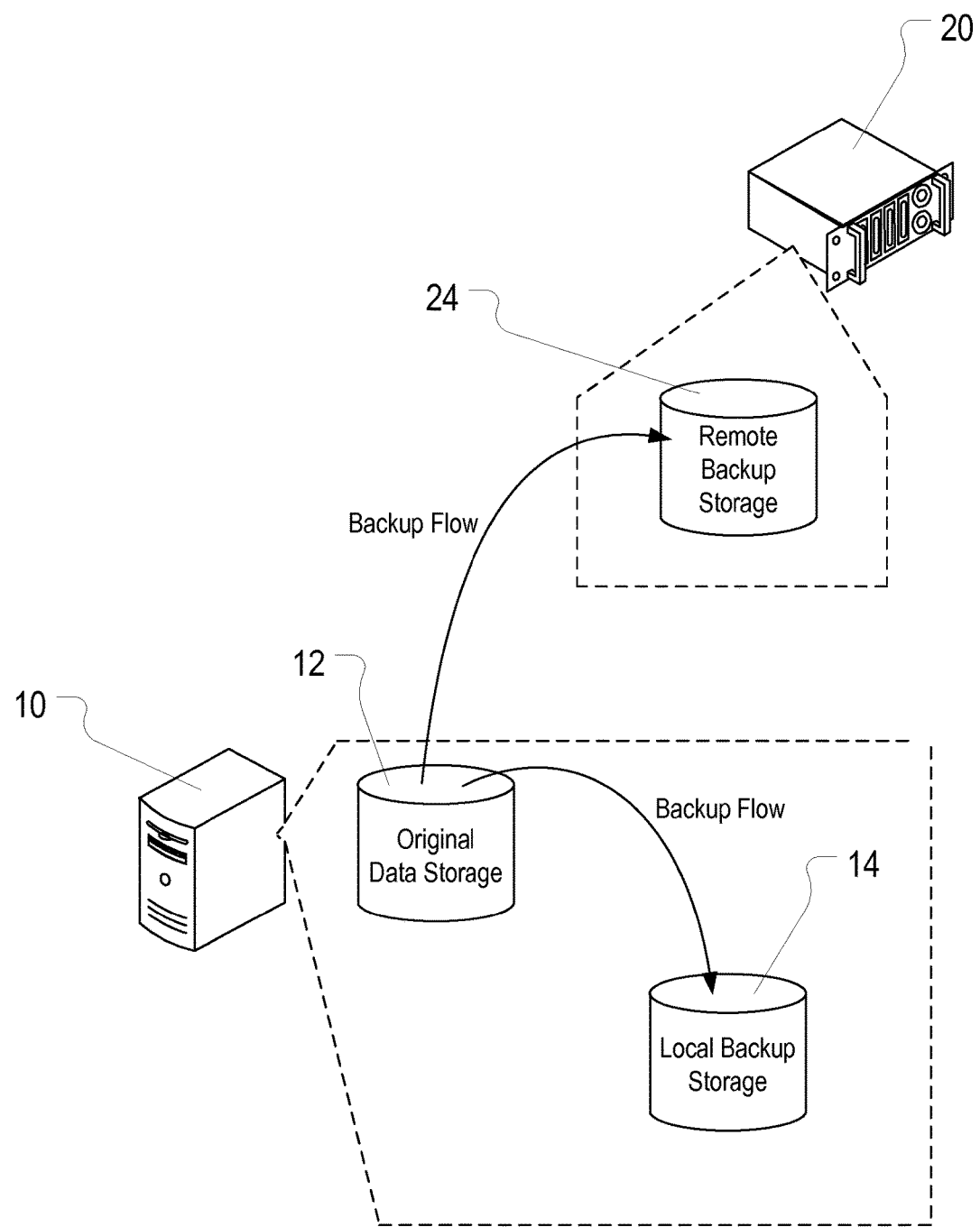
FIG. 1 illustrates an exemplary prior art backup system.

As a preliminary matter, it will readily be understood by one having ordinary skill in the relevant art ("Ordinary Artisan") that the present invention has broad utility and application. As should be understood, any embodiment may incorporate only one or a plurality of the above-disclosed aspects of the invention and may further incorporate only one or a plurality of the above-disclosed features. Furthermore, any embodiment discussed and identified as being "preferred" is considered to be part of a best mode contemplated for carrying out the present invention. Other embodiments also may be discussed for additional illustrative purposes in providing a full and enabling disclosure of the present invention. As should be understood, any embodiment may incorporate only one or a plurality of the above-disclosed aspects of the invention and may further incorporate only one or a plurality of the above-disclosed features. Moreover, many embodiments, such as adaptations, variations, modifications, and equivalent arrangements, will be implicitly disclosed by the embodiments described herein and fall within the scope of the present invention.

Accordingly, while the present invention is described herein in detail in relation to one or more embodiments, it is to be understood that this disclosure is illustrative and exemplary of the present invention, and is made merely for the purposes of providing a full and enabling disclosure of the present invention. The detailed disclosure herein of one or more embodiments is not intended, nor is to be construed, to limit the scope of patent protection afforded the present invention, which scope is to be defined by the claims and the equivalents thereof. It is not intended that the scope of patent protection afforded the present invention be defined by reading into any claim a limitation found herein that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present invention. Accordingly, it is intended that the scope of patent protection afforded the present invention is to be defined by the appended claims rather than the description set forth herein.

Additionally, it is important to note that each term used herein refers to that which the Ordinary Artisan would understand such term to mean based on the contextual use of such term herein. To the extent that the meaning of a term used herein—as understood by the Ordinary Artisan based on the contextual use of such term—differs in any way from any particular dictionary definition of such term, it is intended that the meaning of the term as understood by the Ordinary Artisan should prevail.

Regarding applicability of 35 U.S.C. § 112, ¶6, no claim element is intended to be read in accordance with this statutory provision unless the explicit phrase "means for" or "step for" is actually used in such claim element, whereupon this statutory provision is intended to apply in the interpretation of such claim element.

Furthermore, it is important to note that, as used herein, "a" and "an" each generally denotes "at least one," but does not exclude a plurality unless the contextual use dictates otherwise. Thus, reference to "a picnic basket having an apple" describes "a picnic basket having at least one apple" as well as "a picnic basket having apples." In contrast, reference to "a picnic basket having a single apple" describes "a picnic basket having only one apple."

When used herein to join a list of items, "or" denotes "at least one of the items," but does not exclude a plurality of items of the list. Thus, reference to "a picnic basket having cheese or crackers" describes "a picnic basket having cheese without crackers", "a picnic basket having crackers without cheese", and "a picnic basket having both cheese and crackers." Finally, when used herein to join a list of items, "and" denotes "all of the items of the list." Thus, reference to "a picnic basket having cheese and crackers" describes "a picnic basket having cheese, wherein the picnic basket further has crackers," as well as describes "a picnic basket having crackers, wherein the picnic basket further has cheese."

The term "data protection" may be used herein to refer to a process of protecting original data against loss, e.g. accidental loss in case of disaster. This term is exemplified by backing up data, replicating data, and the like activities.

The terms "backup" and "back up" may be used herein as verbs or noun. In the verb form, these terms may refer to a process of copying and archiving of original data so that a backup copy is created and maintained, which can be in turn be used to restore the original data in the event of data loss. In the noun form, these terms may refer to a copy of the original data, e.g. mirror copy, image level copy, file level copy, file system level copy, application level copy, database level copy, block level copy or byte level copy of the original data, which is purposed to keep and restore data in case of original data loss.

The term "recovery point" or "restore point" may be used herein to refer to a state for a backup copy, which represents the state of the original data at a certain point in time. Preferably, a recovery point can be used to restore the original data as of this state. A single backup copy may have one or many recovery points.

The terms "synchronization", "backup synchronization" and "backup copy synchronization" may be used herein to refer to a process of establishing consistency among data from primary backup storage to secondary data storage, and consequent harmonization of the data over time. This can be related to synchronization of a primary backup copy to the original data, or to synchronization of a secondary backup copy to a primary backup copy.

The term "data processing engine" may be used herein to refer to computer implemented methods and processes of a system described herein, which is intended to receive requests, respond to the requests, read, transfer and write data, process data, create, maintain and synchronize backup copies. A data processing engine may be run by one or more computer processors.

The terms "backup storage" and "backup copy storage" may be used to refer to a data storage device or medium or to a data structure or container or logical structure disposed on such a device or medium. Such a device or medium may include a magnetic device or medium, semiconductor device or medium, optical device or medium, and the like, used to store backup copies. This can be exemplified by hard disk, magnetic tape, optical disk, solid state drive, and the like. The term may also refer to a capacity of the medium used to store backup copies.

As used herein, the term "network", "data network" or "computer network" may be used to mean an infrastructure capable of connecting two or more computers either using wires or wirelessly allowing them to transmit and receive data. Non-limiting examples of computer networks may include local networks and wide networks, intranet, internet, wired networks, or wireless networks (i.e. a "wireless network") which may include Wi-Fi and cellular networks.

Referring now to the drawings, one or more preferred embodiments of the present invention are next described. The following description of one or more preferred embodiments is merely exemplary in nature and is in no way intended to limit the invention, its implementations, or uses.

Figure 2:
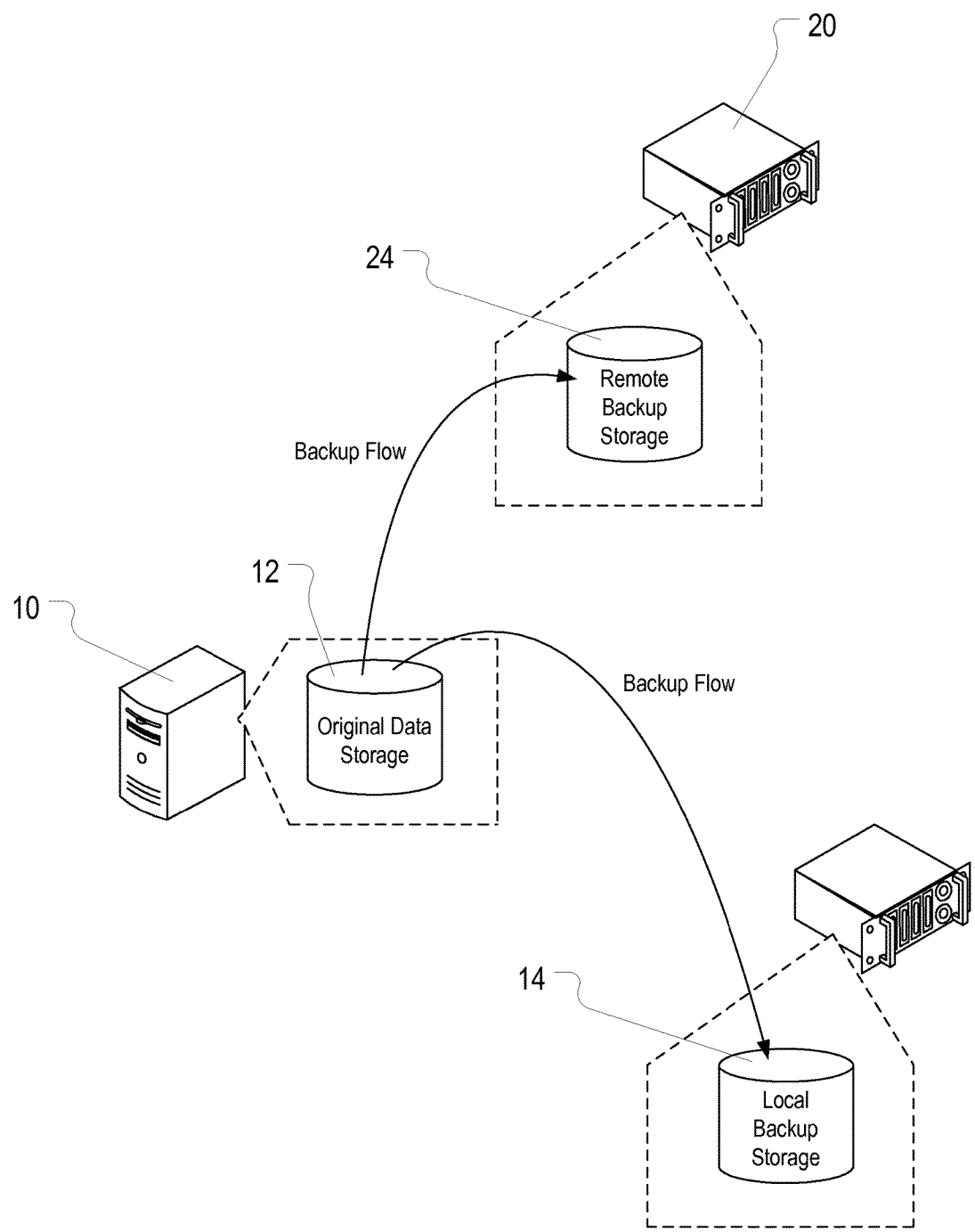
FIG. 2 illustrates a system similar to that of FIG. 1.

As described hereinabove, backing up data to prevent data loss in the event of disaster is a normal industry practice. FIG. 1 illustrates an exemplary prior art system in which data from original storage 12 at a device 10 is backed up to both local backup storage 14 and remote backup storage 24 at another device 20. The local backup storage 24 may be located at the same device as illustrated in FIG. 1, or another local device as illustrated in FIG. 2.

As noted hereinabove, although it is sometimes desired to have multiple backup copies, it is not always efficient or effective to create two backup copies if creation of each of the copies involves reading the original data. In accordance with one or more preferred implementations, backup copy synchronization is utilized to enable archiving of data to multiple locations without the need to read the original data multiple times.

In accordance with one or more preferred implementations, a system is configured to provide for synchronization of one or more secondary backup copies with a primary backup copy. In accordance with one or more preferred implementations, a synchronization process keeps one or more secondary backup copies synchronized with a primary backup copy, which is, in turn, synchronized with original data.

In accordance with one or more preferred implementations, the synchronization of backup copies is implemented in a way that does not require reference to the original data and that efficiently utilizes available hardware and software resources.

In accordance with one or more preferred implementations, a data processing engine is utilized to create and maintain a primary backup copy of original data, and is configured to synchronize data from such primary backup copy to a secondary backup copy. Such a data processing engine is preferably capable of reading, writing, compressing, de-duplicating, encrypting, transmitting and receiving data. In accordance with various implementations, a data processing engine may run on a physical or virtual computer.

Figure 3:
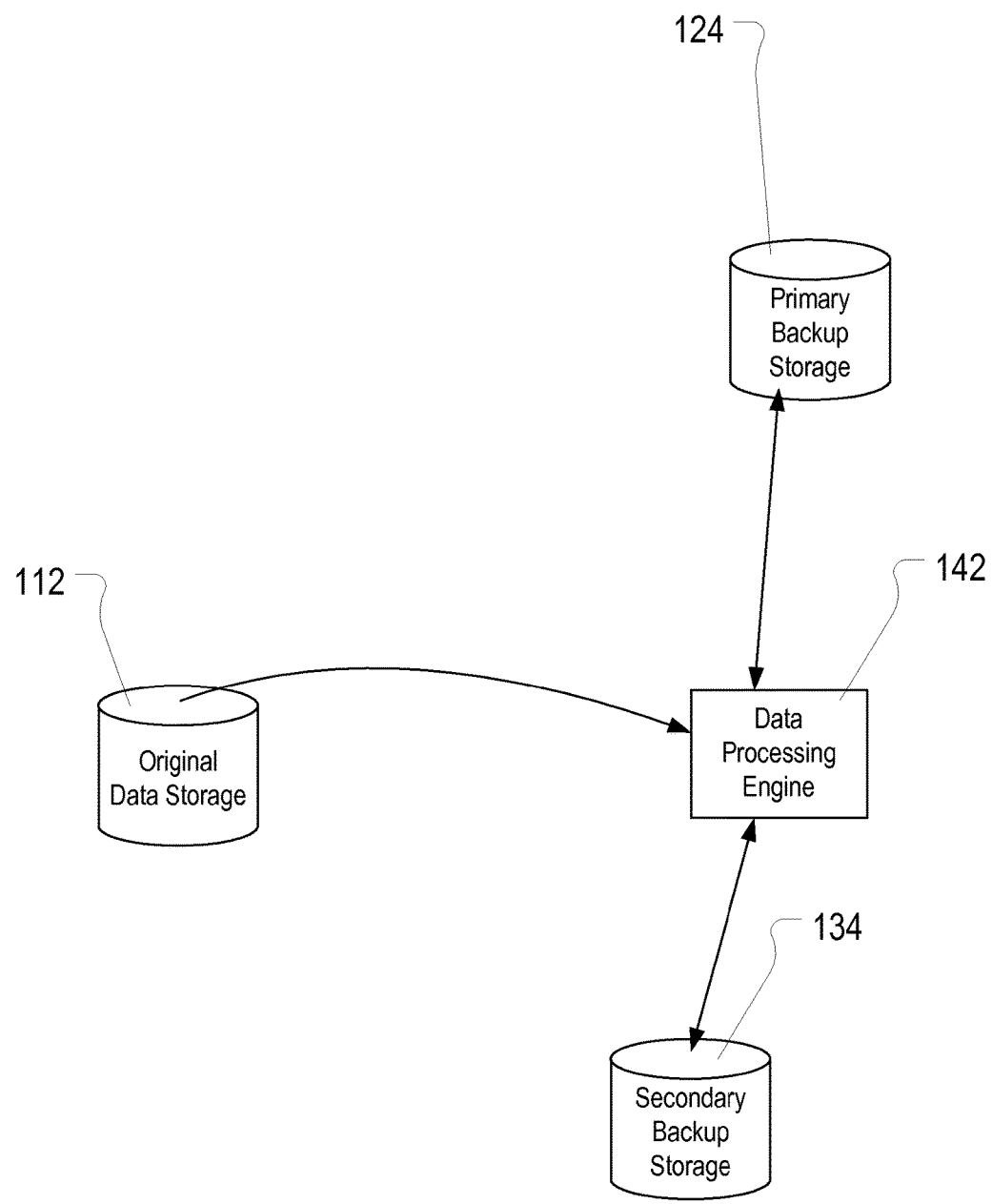
FIGS. 3-8 illustrate exemplary implementations of systems for backup synchronization.

FIG. 3 illustrates an exemplary implementation of a system for backup synchronization. The system includes a data processing engine 142 which has been utilized to create a primary backup storage 124 to store a copy of original data in the original data storage 112, and is utilized to maintain that primary backup copy by synchronizing the primary backup store with the original data store. In accordance with one or more preferred implementations, a data processing engine may be dedicated to use for one process or application, or may be configured for use by multiple processes or applications simultaneously.

In accordance with one or more preferred implementations, after a primary backup copy is created, it is replicated to produce a secondary backup copy. Preferably, the secondary backup copy, once created, will correspond to the certain state of the primary backup copy.

The data processing engine 142 is configured to allow for creation of secondary backup. In one or more preferred implementations, a data processing engine is configured to create a secondary backup and replicate the primary backup into it.

FIG. 3 illustrates secondary backup storage 134 that has been created utilizing the data processing engine 142, with data from the primary backup storage 124 having been replicated into it. Preferably, thereafter, the data processing engine 142 is configured to maintain a secondary backup copy by synchronizing the secondary backup storage 134 with the primary backup storage 124. Although only a single secondary backup storage is illustrated, in one or more preferred implementations, additional backup storage may be utilized.

The components of the system of FIG. 3 may be arranged in various architectures as needed. For example, each component may be disposed at its own electronic device, or one or more components may be disposed at the same electronic device.

Figure 4:
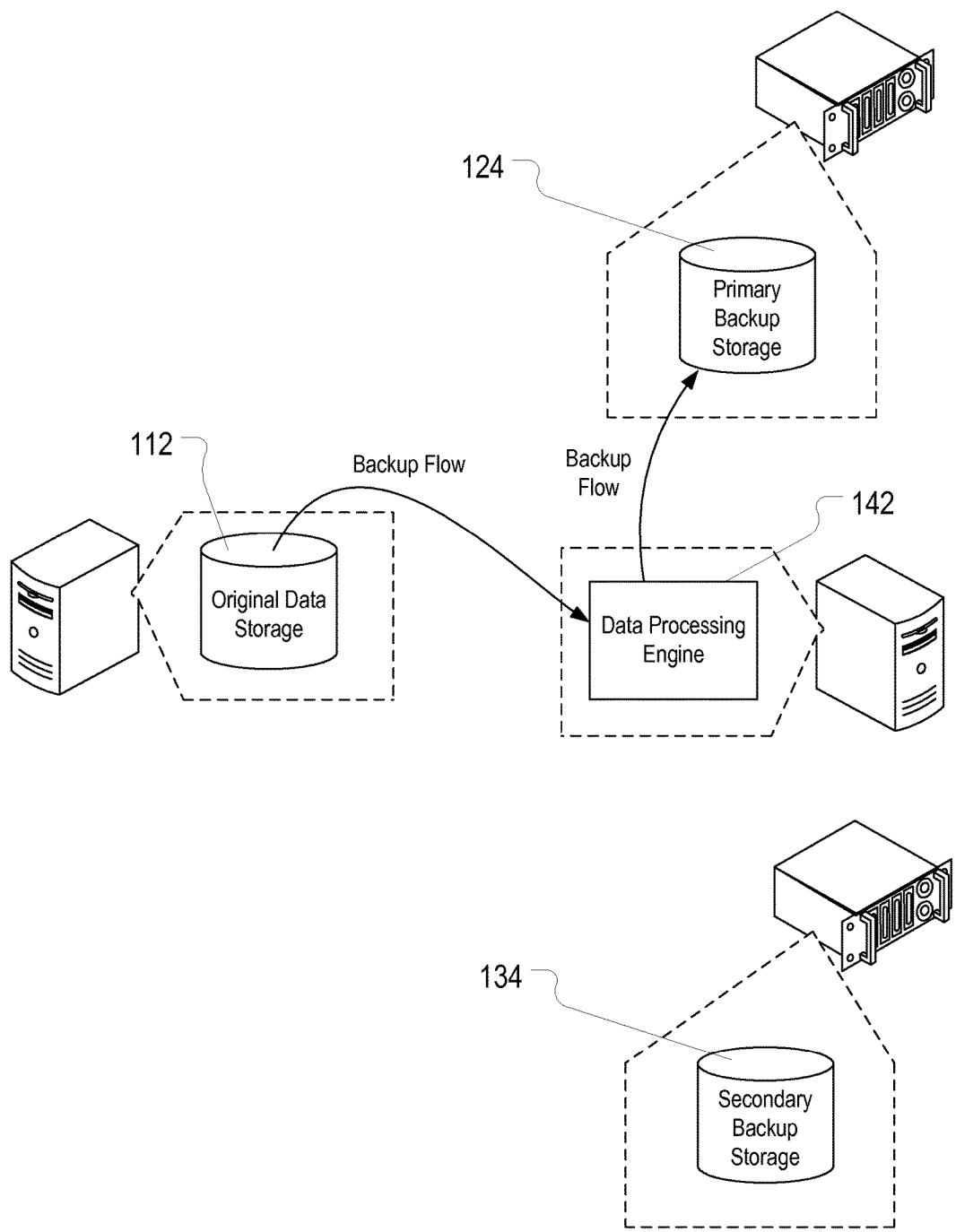
Figure 5:
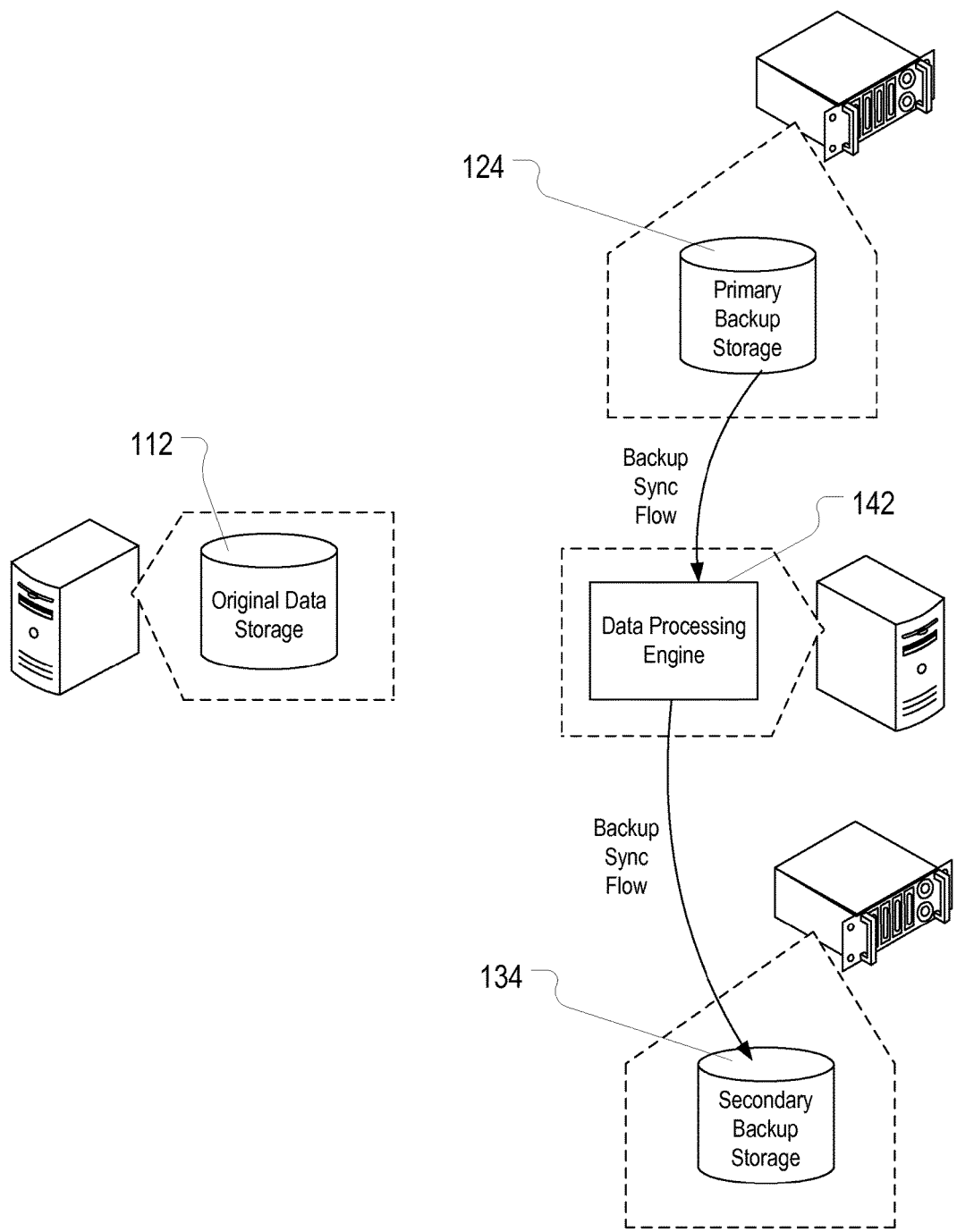

FIGS. 4 and 5 illustrate an exemplary system in which each component is disposed at a different electronic device. In particular, FIGS. 4 and 5 illustrate the general flow of data from original data storage 112 to secondary backup storage 134. As illustrated in FIG. 4, original data is being backed up by data processing engine 142 and archived to primary backup storage 124, resulting in a primary backup copy located on the primary backup storage 124. Thereafter, as illustrated in FIG. 5, the primary backup copy is replicated from the primary backup storage 124 to the secondary backup storage 134 through the use of data processing engine 142, resulting in a secondary backup copy on the secondary backup storage 134. The secondary backup copy is synchronized with the primary backup copy through the utilization of the data processing engine 142, and changes made to the primary backup copy are replicated to the secondary backup copy.

In accordance with one or more preferred implementations, multiple data processing engines may be utilized. In one or more preferred implementations, this enables traffic optimization, such as data compression or de-duplication, in a link between data processing engines. This is preferred when backup copies are synchronized over a wide area network where network utilization performance is extremely important.

Figure 6:
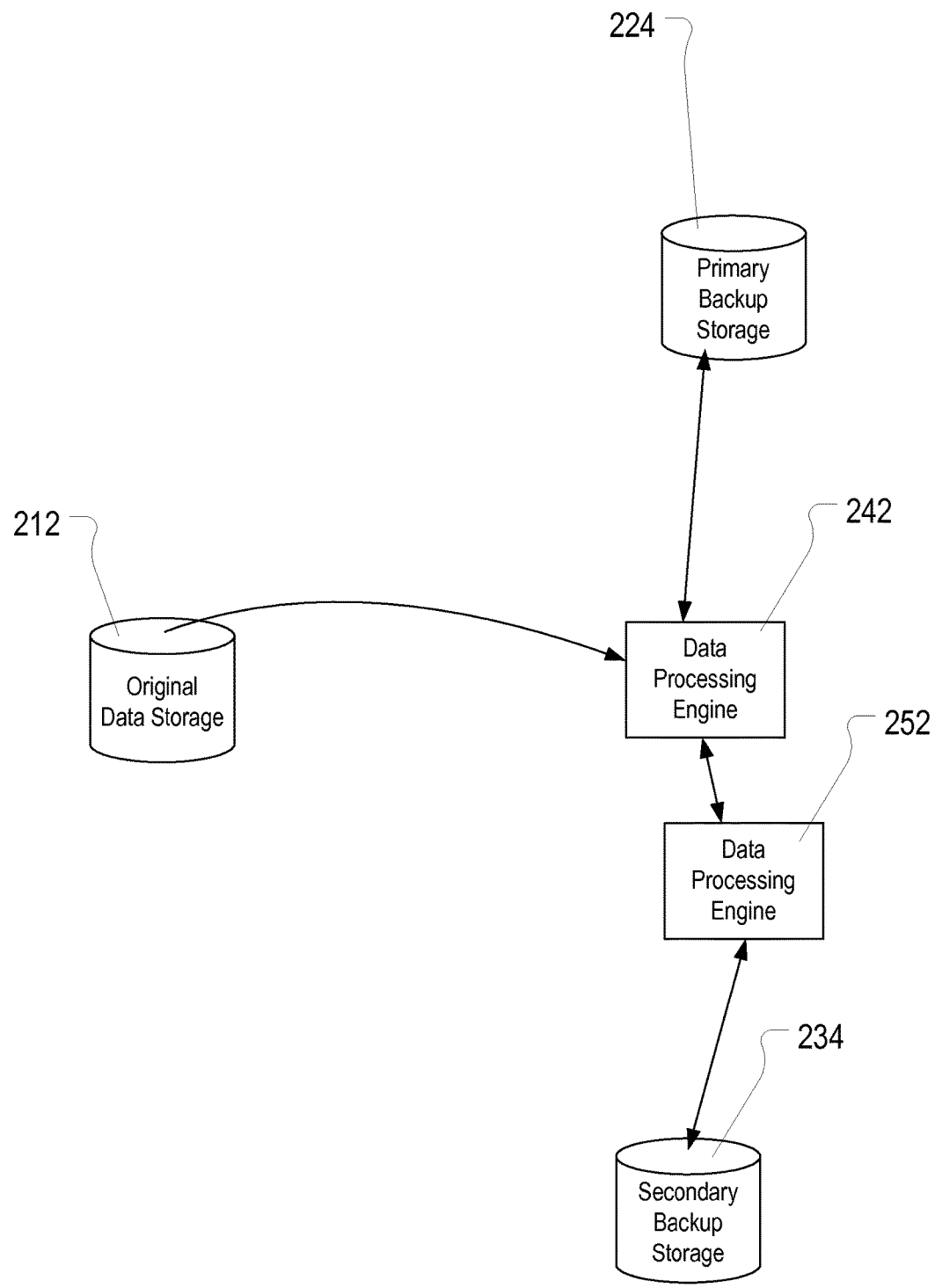

FIG. 6 illustrates an exemplary system where multiple data processing engines are utilized for backup copy synchronization. In this system, a first data processing engine 242 is utilized to access primary backup storage 224, and a second data processing engine 252 is utilized to access secondary backup storage 234. Although only two data processing engines are illustrated, in accordance with one or more preferred implementations additional data processing engines and secondary backup storage may be utilized. In one or more preferred implementations, each data processing engine may be associated with a single primary or secondary data storage, while in one or more preferred implementations one or more data processing engines may be associated with two or more data storages.

In the system illustrated in FIG. 6, data processing engine 242 and data processing engine 252 operate in conjunction with each other. In one or more preferred implementations, these engines are located on different computers, and such operation is achieved by interconnecting the computers these engines are located on. In one or more preferred implementations, data processing engine 242 may not have access to secondary backup storage 234, and data processing engine 252 may not have access to primary backup storage 224. Preferably, communication and data replication occurs between data processing engine 242 and data processing engine 252.

The components of the system of FIG. 6 may be arranged in various architectures as needed. For example, each component may be disposed at its own electronic device, or one or more components may be disposed at the same electronic device.

Figure 7:
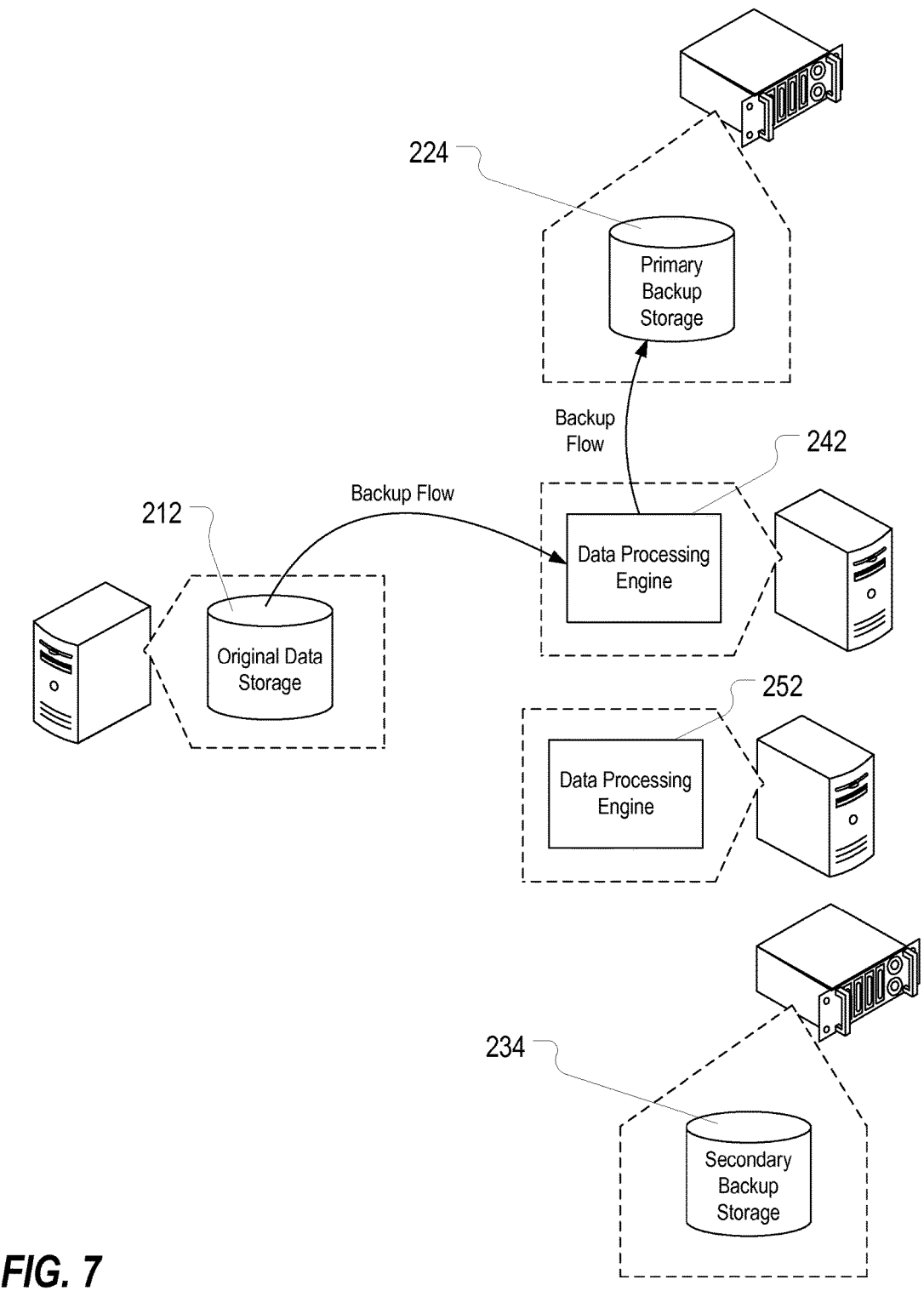
Figure 8:
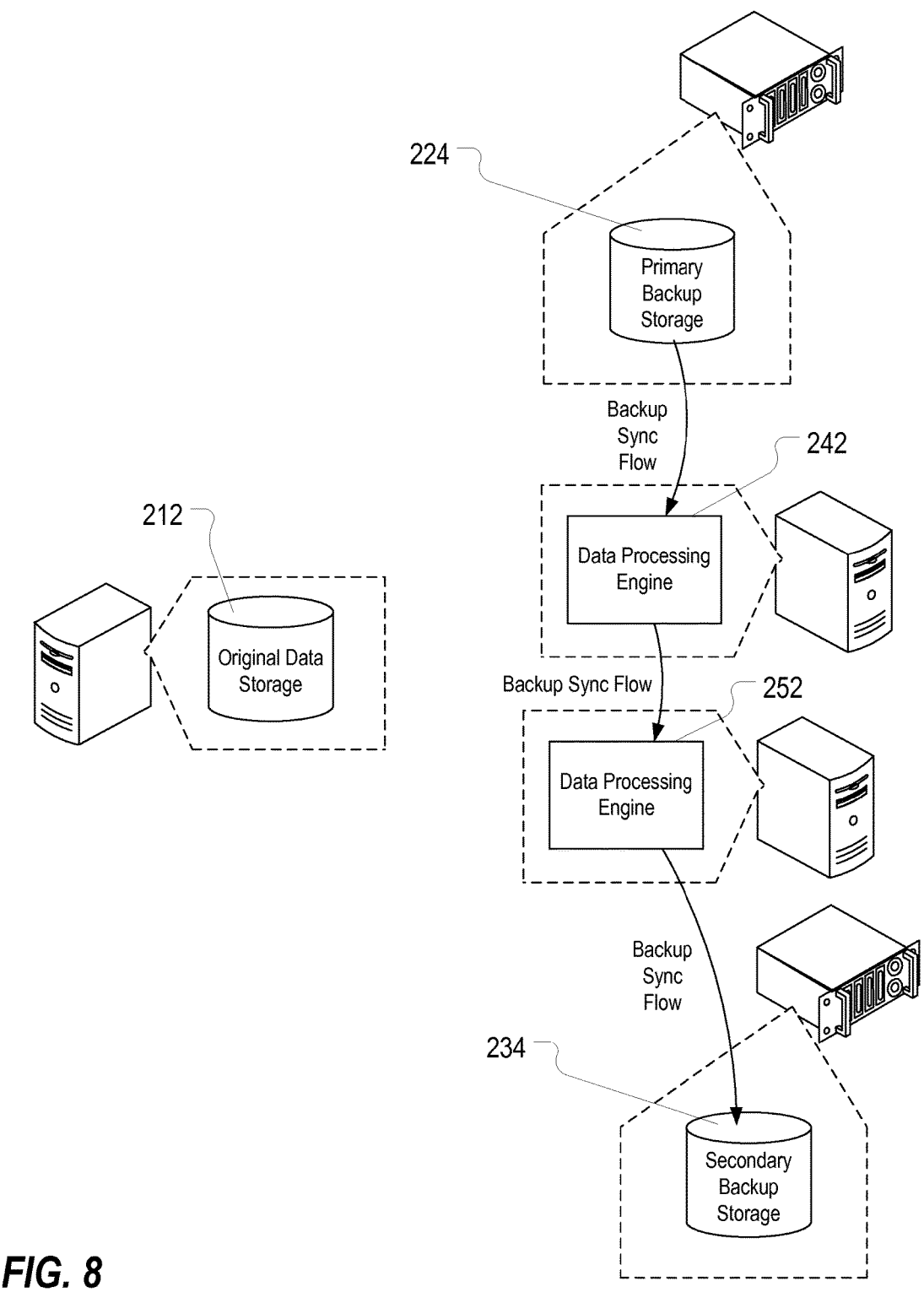

FIGS. 7 and 8 illustrate an exemplary system in which each component is disposed at a different electronic device. In particular, FIGS. 7 and 8 illustrate the general flow of data from original data storage 212 to secondary backup storage 234. As illustrated in FIG. 7, original data is being backed up by data processing engine 242 and archived to primary backup storage 224, resulting in a primary backup copy located on the primary backup storage 224. Thereafter, as illustrated in FIG. 8, the primary backup copy is replicated from the primary backup storage 224 to the secondary backup storage 234 through the use of data processing engines 242,252, resulting in a secondary backup copy on the secondary backup storage 234. The secondary backup copy is synchronized with the primary backup copy through the utilization of the data processing engines 242,252, and changes made to the primary backup copy are replicated to the secondary backup copy.

Figure 9:
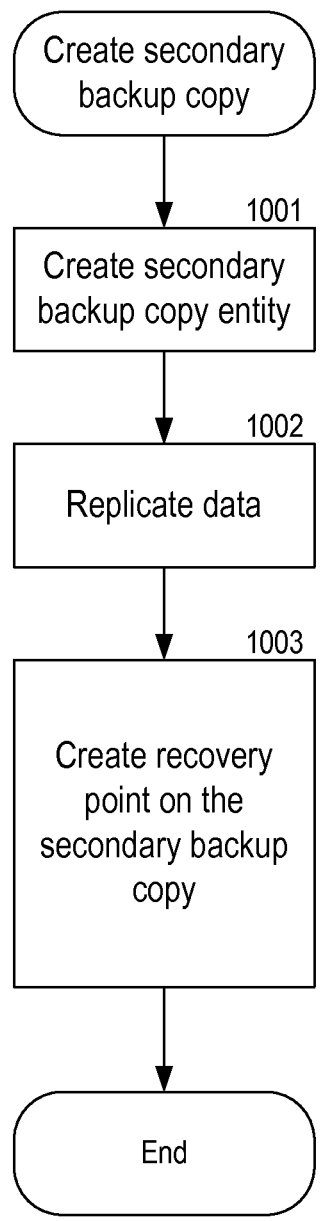
FIG. 9 illustrates an exemplary routine for creating a secondary backup copy.

FIG. 9 illustrates an exemplary routine for creating a secondary backup copy. In accordance with this routine, one or more data processing engines are requested to create a secondary backup copy.

This routine begins at step 1001, where a secondary backup copy entity (e.g. secondary backup storage) is created. At this stage, the secondary backup copy entity does not contain backup data. At step 1002, data is replicated from a primary backup copy to the newly created secondary backup copy entity. Next, at step 1003, a recovery point is created on the secondary backup copy. At this point, the secondary backup copy has all the data replicated from the primary backup copy, and the routine ends.

Figure 10:
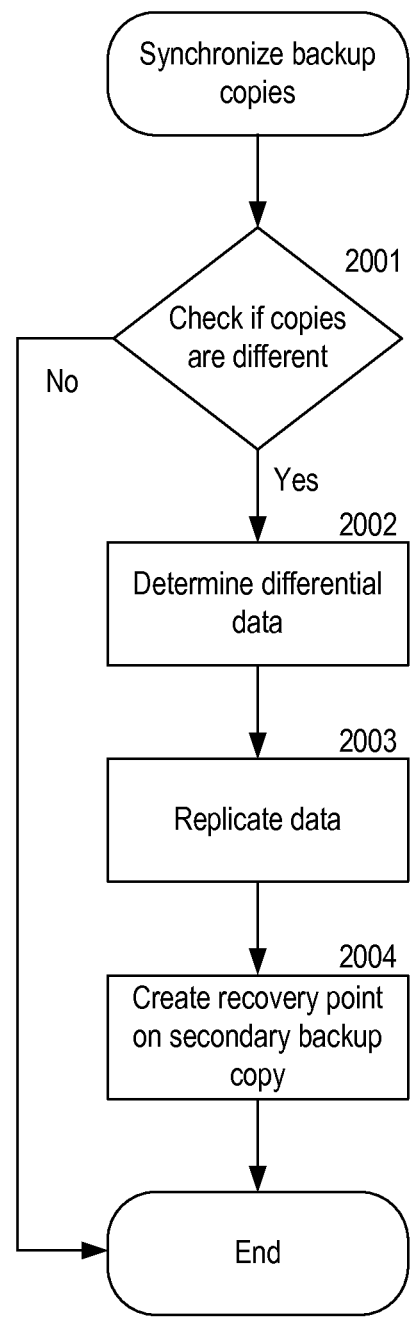
FIG. 10 illustrates an exemplary routine for synchronization of backup copies.

FIG. 10 illustrates an exemplary routine for synchronization of backup copies. In accordance with one or more preferred implementations, changes can be made to a primary backup copy, which need to be reflected in the secondary backup copy. These changes might have been made by a backup process that reflects changes in the original data in the primary backup copy.

In accordance with one or more preferred implementations, a data processing engine is configured to synchronize a primary backup copy with original data at a certain time interval, and the same or a different data processing engine is configured to synchronize a secondary backup copy with the primary backup copy at the same or a different time interval.

FIG. 10 illustrates synchronization of data in a secondary backup copy with the data in a primary backup copy as one or more data processing engines are requested to perform the synchronization. The routine begins at operation 2001, where a check is performed to determine whether backup copies are different. Specifically, a determination is made as to whether the secondary backup copy is different from the primary backup copy. If the backup copies are not different (e.g. already synchronized), then the routine ends.

In accordance with one or more preferred implementations, synchronization is implemented in a way that only differences between primary and secondary backup copies will be transmitted for updating of a secondary backup copy. Preferably, the difference between backup copies is determined and/or tracked by one or more data processing engines involved in a synchronization process.

In accordance with one or more preferred implementations, if backup copies are different (e.g. not synchronized), then the routine turns to operation 2002, where one or more differences between the backup copies is determined. Data relating to these one or more differences can be characterized as differential data.

In accordance with one or more preferred implementations, a primary backup copy may be configured to contain data regarding changes since its last synchronization with a secondary backup copy. In such cases, the determination of differential data may be performed when data is updated at original data storage or when a backup copy is synchronized with an original data store. In one or more preferred implementations in which differential data is contained within a backup copy, a step of determining differential data during the illustrated routine may not be necessary.

In any event, the routine proceeds to operation 2004, where differential data is replicated from a primary backup copy to a secondary backup copy. The routine then continues to operation 2005, where a recovery point is created on the secondary backup copy. At this point, the secondary backup copy is synchronized to the primary backup copy.

Figure 11:
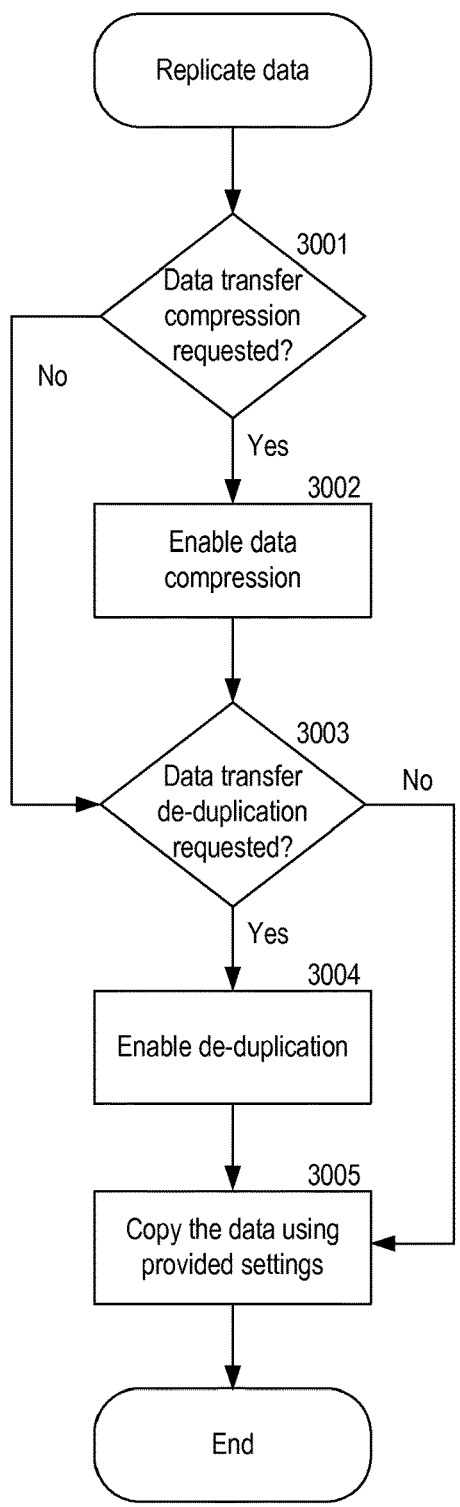
FIG. 11 illustrates an exemplary routine for replication of data.

Referring to FIG. 11, an illustrative routine will be described for replication of data. The replication may occur during the creation of a secondary backup copy or during the synchronization of backup copies. In accordance with one or more preferred implementations, replication may be performed in conjunction with one or more possible performance optimizations. In accordance with one or more preferred implementations, data transfer compression or data transfer de-duplication may be requested. The exemplary routine begins at operation 3001, where a determination is made as to whether data transfer compression was requested or not. If data transfer compression was not requested, the routine proceeds from operation 3001 to operation 3003. If data transfer compression was requested, the routine proceeds from operation 3001 to operation 3002, where data compression is enabled.

The routine then continues to operation 3003, where a determination is made as to whether data transfer de-duplication was requested or not. If data transfer de-duplication was not requested, the routine proceeds from operation 3003 to operation 3005. If data transfer de-duplication was requested, the routine proceeds from operation 3003 to operation 3004, where data de-duplication is enabled.

The routine continues to operation 3005, where data is copied using the provided settings. Preferably, if data compression was enabled, the data is compressed during the transfer, and if data de-duplication was enabled, the data is de-duplicated during the transfer.

While the subject matter described herein is presented in the general context of program modules that execute in conjunction with the execution of an operating system and application programs on a computer system, those skilled in the art will recognize that other implementations may be performed in combination with other types of program modules.

Generally, program modules include routines, programs, components, data structures, and other types of structures that perform particular tasks or implement particular abstract data types.

Moreover, those skilled in the art will appreciate that the subject matter described herein may be practiced with other computer system configurations, including hand-held devices, multiprocessor systems, microprocessor-based or programmable consumer electronics, minicomputers, mainframe computers, computer clusters, computing clouds and the like.

Based on the foregoing, it should be appreciated that technologies for implementing synchronization of backup copies are presented herein. Although the subject matter presented herein has been described in language specific to computer structural features, methodological acts, and computer readable media, it is to be understood that the invention defined in the appended claims is not necessarily limited to the specific features, acts, or media described herein. Rather, the specific features, acts and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

Based on the foregoing description, it will be readily understood by those persons skilled in the art that the present invention is susceptible of broad utility and application. Many embodiments and adaptations of the present invention other than those specifically described herein, as well as many variations, modifications, and equivalent arrangements, will be apparent from or reasonably suggested by the present invention and the foregoing descriptions thereof, without departing from the substance or scope of the present invention. Accordingly, while the present invention has been described herein in detail in relation to one or more preferred embodiments, it is to be understood that this disclosure is only illustrative and exemplary of the present invention and is made merely for the purpose of providing a full and enabling disclosure of the invention. The foregoing disclosure is not intended to be construed to limit the present invention or otherwise exclude any such other embodiments, adaptations, variations, modifications or equivalent arrangements, the present invention being limited only by the claims appended hereto and the equivalents thereof.

What is claimed is:

1. A method providing a technical solution to the technical problem of how to efficiently create and maintain multiple backup copies without having to separately read the original data for each of the backup copies, the method comprising:
   (a) receiving, at a data processing engine running on a first electronic device from a second electronic device associated with original storage, first data corresponding to a first version of original data stored in the original data storage;
   (b) effecting creating, in primary backup storage at a location remote to the first electronic device based on the received first data, a primary backup copy of the first version of the original data;
   (c) receiving, at the data processing engine running on the first electronic device from the primary backup storage, second data corresponding to the primary backup copy stored at the primary backup storage;
   (d) effecting creating, in secondary backup storage at a second location remote to the first electronic device based on the received second data, a secondary backup copy of the first version of the original data;
   (e) periodically, based on a first time interval,
      (i) determining, by the data processing engine, whether the original data stored in the original data storage has been changed, and
      (ii) if it is determined that the original data stored in the original data storage has been changed, automatically synchronizing, by the data processing engine based on data received from the original data storage, the primary backup copy stored in the primary backup storage to correspond to an updated version of the original data,
      (iii) wherein this includes
         (A) determining, by the data processing engine, that the original data stored in the original data storage has been changed to a second version, and
         (B) based on determining that the original data stored in the original data storage has been changed to the second version, automatically synchronizing, by the data processing engine based on data received from the original data storage, the primary backup copy stored in the primary backup storage to correspond to the second version; and
   (g) periodically, based on a second time interval,
      (i) determining, by the data processing engine, whether the primary backup copy stored in the primary backup storage differs from the secondary backup copy stored in the secondary backup storage, and
      (ii) if it is determined that the primary backup copy stored in the primary data storage differs from the secondary backup copy stored in the secondary data storage, automatically synchronizing, by the data processing engine based on differential data received from the primary backup storage, the secondary backup copy to correspond to the first backup copy,
      (iii) wherein this includes
         (A) determining, by the data processing engine, that the primary backup copy stored in the primary backup storage differs from the secondary backup copy stored in the secondary backup storage, and
         (B) based on determining that the primary backup copy stored in the primary data storage differs from the secondary backup copy stored in the secondary data storage, automatically synchronizing, by the data processing engine based on differential data received from the primary backup storage, the secondary backup copy to correspond to the second version;

(h) wherein, via performance of this method, the secondary backup copy stored in the secondary data storage is periodically indirectly synchronized to data stored in the original data storage via the primary backup copy stored in the primary data storage being both
  (i) periodically synchronized, based on the first time interval, to data in the original data storage, and
  (ii) periodically used to synchronize, based on the second time interval, the secondary backup copy stored in the secondary data storage.

2. The method of claim 1, wherein the first electronic device comprises a physical computer.

3. The method of claim 1, wherein the first electronic device comprises a virtual computer.

4. The method of claim 1, wherein the first electronic device comprises a processor.

5. The method of claim 1, wherein the first electronic device comprises a server.

6. The method of claim 1, wherein the original data storage is located at a server computer.

7. The method of claim 1, wherein the original data storage is located at a desktop computer.

8. The method of claim 1, wherein the original data storage is located at a laptop computer.

9. The method of claim 1, wherein the original data storage is located at a mobile device.

10. The method of claim 1, wherein the original data storage is located at a phone.

11. The method of claim 1, wherein the original data storage is located at a tablet.

12. The method of claim 1, wherein the original data storage is located at a private cloud.

13. The method of claim 1, wherein the original data storage is located at a public cloud.

14. The method of claim 1, wherein the method comprises use of data compression while synchronizing data.

15. The method of claim 1, wherein the method comprises use of data de-duplication while synchronizing data.

16. The method of claim 1, wherein the method comprises use of data encryption while synchronizing data.

17. A method providing a technical solution to the technical problem of how to efficiently create and maintain multiple backup copies without having to separately read the original data for each of the backup copies, the method comprising:

(a) receiving, at a first data processing engine running on a first electronic device from a second electronic device associated with original storage, first data corresponding to a first version of original data stored in the original data storage;

(b) effecting creating, in primary backup storage at a location remote to the first electronic device based on the received first data, a primary backup copy of the first version of the original data;

(c) receiving, at the first data processing engine running on the first electronic device from the primary backup storage, second data corresponding to the primary backup copy stored at the primary backup storage, and communicating the second data to a second data processing engine;

(d) effecting creating, by the second data processing engine in secondary backup storage based on the received second data, a secondary backup copy of the first version of the original data;

(e) periodically, based on a first time interval,
  (i) determining, by the first data processing engine, whether the original data stored in the original data storage has been changed, and
  (ii) if it is determined that the original data stored in the original data storage has been changed, automatically synchronizing, by the first data processing engine based on data received from the original data storage, the primary backup copy stored in the primary backup storage to correspond to an updated version of the original data,
  (iii) wherein this includes
    (A) determining, by the first data processing engine, that the original data stored in the original data storage has been changed to a second version, and
    (B) based on determining that the original data stored in the original data storage has been changed to the second version, automatically synchronizing, by the first data processing engine based on data received from the original data storage, the primary backup copy stored in the primary backup storage to correspond to the second version; and (g) periodically, based on a second time interval,
  (i) determining, by one or more of the first data processing engine and the second data processing engine, whether the primary backup copy stored in the primary backup storage differs from the secondary backup copy stored in the secondary backup storage, and
  (ii) if it is determined that the primary backup copy stored in the primary data storage differs from the secondary backup copy stored in the secondary data storage, automatically synchronizing, by the first and second data processing engines based on differential data received from the primary backup storage, the secondary backup copy to correspond to the first backup copy,
  (iii) wherein this includes
    (A) determining, by one or more of the first data processing engine and the second data processing engine, that the primary backup copy stored in the primary backup storage differs from the secondary backup copy stored in the secondary backup storage, and
    (B) based on determining that the primary backup copy stored in the primary data storage differs from the secondary backup copy stored in the secondary data storage, automatically synchronizing, by the first and second data processing engines based on differential data received from the primary backup storage, the secondary backup copy to correspond to the second version;

(h) wherein, via performance of this method, the secondary backup copy stored in the secondary data storage is periodically indirectly synchronized to data stored in the original data storage via the primary backup copy stored in the primary data storage being both
  (i) periodically synchronized, based on the first time interval, to data in the original data storage, and
  (ii) periodically used to synchronize, based on the second time interval, the secondary backup copy stored in the secondary data storage.

18. The method of claim 17, wherein the first electronic device comprises a physical computer.

19. The method of claim 1, wherein the first time interval and the second time interval are the same time interval.

20. The method of claim 1, wherein the first time interval and the second time interval are different time intervals.

* * * * *